US012681373B2

(12) United States Patent
Hsu

(10) Patent No.: US 12,681,373 B2
(45) Date of Patent: Jul. 14, 2026

(54) COLOR WHEEL MODULE AND PROJECTION DEVICE

(71) Applicant: Coretronic Corporation, Hsin-Chu (TW)

(72) Inventor: Pi-Tsung Hsu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 644 days.

(21) Appl. No.: 17/982,526

(22) Filed: Nov. 8, 2022

(65) Prior Publication Data

US 2023/0141316 A1 May 11, 2023

(30) Foreign Application Priority Data

Nov. 11, 2021 (CN) .......................... 202111331055.7

(51) Int. Cl.
*G03B 21/20* (2006.01)
*G03B 21/14* (2006.01)

(52) U.S. Cl.
CPC ......... *G03B 21/204* (2013.01); *G03B 21/147* (2013.01); *G03B 21/2066* (2013.01)

(58) Field of Classification Search
None
See application file for complete search history.

(56) References Cited

U.S. PATENT DOCUMENTS

2005/0046981 A1 3/2005 Karube et al.
2006/0209440 A1* 9/2006 Bang ...................... G03B 33/08
348/E9.027

(Continued)

FOREIGN PATENT DOCUMENTS

CN 1726721 1/2006
CN 103293840 9/2013
CN 104330947 2/2015

(Continued)

OTHER PUBLICATIONS

"Office Action of China Counterpart Application", issued on Jul. 10, 2025, p. 1-p. 12.

(Continued)

*Primary Examiner* — Bao-Luan Q Le
*Assistant Examiner* — Danell L Owens
(74) *Attorney, Agent, or Firm* — JCIPRNET

(57) ABSTRACT

A color wheel module is disposed on a transmission path of an excitation beam and includes a driving assembly, a substrate, a fastening element, at least one wavelength conversion layer, and filters. The substrate is connected to the filters, and the filters are fixed between the fastening element and the driving assembly. The substrate includes an outer periphery and a light conversion region located on the outer periphery. The outer periphery extends in an extension direction and has a width parallel to the extension direction. The extension direction and a radial direction of the substrate forms an included angle. The wavelength conversion layers are disposed in the light conversion region. The excitation beam is incident on the light conversion region of the substrate and converted into a conversion beam, and the conversion beam is guided to penetrate the corresponding filter along a direction parallel to the central axis.

12 Claims, 9 Drawing Sheets

(56)                         References Cited

U.S. PATENT DOCUMENTS

2015/0146174 A1      5/2015  Ferri et al.
2020/0004120 A1 *    1/2020  Chen ...................... G03B 21/00

FOREIGN PATENT DOCUMENTS

| CN | 104880896 | 9/2015 | |
| CN | 106444251 | 2/2017 | |
| CN | 207164450 | 3/2018 | |
| CN | 108931878 | 12/2018 | |
| CN | 208537894 | 2/2019 | |
| CN | 109991801 | 7/2019 | |
| CN | 109991802 | 7/2019 | |
| CN | 111221208 | 6/2020 | |
| CN | 111381358 | 7/2020 | |
| JP | 2006133357 | 5/2006 | |
| JP | 2012048847 | 3/2012 | |
| WO | 2019134260 | 7/2019 | |
| WO | WO-2019134261 A1 * | 7/2019 | ............... F21V 9/00 |

OTHER PUBLICATIONS

"Office Action of China Counterpart Application", issued on Jun. 20, 2025, p. 1-p. 9.

* cited by examiner

10

COLOR WHEEL MODULE AND PROJECTION DEVICE

CROSS-REFERENCE TO RELATED APPLICATION

This application claims the priority benefit of China application serial no. 202111331055.7, filed on Nov. 11, 2021. The entirety of the above-mentioned patent application is hereby incorporated by reference herein and made a part of this specification.

BACKGROUND

Technical Field

The disclosure relates to an optical module and a projection device, and more particularly to a color wheel module and a projection device using the color wheel module.

Description of Related Art

At present, a wavelength conversion region of a phosphor wheel of a projector is usually provided on a plane of a heat dissipation substrate, where the plane in a radial direction and the rotating axis of the phosphor wheel are perpendicular to each other, and the wavelength conversion region is provided in a ring shape around the rotating axis. Some phosphor wheels are also provided with a filter area on the plane in a radial direction of the heat dissipation substrate, where the filter area is also provided in a ring shape around the rotating axis such that the phosphor wheel also can also function as a filter wheel.

However, because the wavelength conversion region is usually provided on the plane in the radial direction of the heat dissipation substrate at present, the space allocation flexibility of the phosphor wheel in the projector's optical engine is limited and the optical path of the incident light and the output light of the wavelength conversion region may only be arranged in the direction parallel to the axial direction, which greatly reduces the space arrangement of the projector's optical engine. Moreover, the wavelength conversion layers disposed in the wavelength conversion region generate a large amount of heat after being excited by the excitation light during the operation period of the projector. The heat needs to be withdrew through the heat dissipation substrate to reduce the temperature of the wavelength conversion layers and improve the excitation efficiency of the wavelength conversion layers. Furthermore, the heat dissipation efficiency of the wavelength conversion layers is related to the location of the heat dissipation substrate which the wavelength conversion layer are disposed at. The closer to the outer diameter of the heat dissipation substrate, the higher the linear velocity of the phosphor wheel when rotating, and therefore the better the heat dissipation efficiency of the phosphor wheel. However, currently the average position of the wavelength conversion layers in the phosphor wheel cannot be provided on the outermost outer diameter of the heat dissipation substrate, thus making the heat dissipation effect of the phosphor wheel limited. Moreover, different wavelength conversion layers on the same plane cannot be excited at the same time, but must be separately excited at different timings through timing control, which results in poor excitation efficiency and poor heat dissipation.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure provides a color wheel module that has better heat dissipation effect.

The disclosure further provides a projection device, which includes the color wheel module and has better projection quality and product competitiveness.

Other objectives and advantages of the disclosure may be further understood from the technical features disclosed herein.

An embodiment of the disclosure provides a color wheel module, disposed on a transmission path of an excitation beam. The color wheel module includes a driving assembly, a substrate, a fastening element, at least one wavelength conversion layer, and a plurality of filters. The filters are disposed around a rotating axis in a manner perpendicular to the rotating axis of the driving assembly. The fastening element is attached to the filters along the rotating axis. The substrate is connected to the filters, and the filters are fixed between the fastening element and the driving assembly. The driving assembly drives the substrate and the filters to rotate with the rotating axis as a central axis. The substrate includes an outer periphery surrounding the central axis, the substrate includes a light conversion region located on the outer periphery, and the outer periphery extends in an extension direction. The extension direction and a radial direction of the substrate form an included angle, and the outer periphery has a width parallel to the extension direction. The wavelength conversion layers are disposed in the light conversion region of the substrate. The excitation beam is incident on the light conversion region of the substrate and converted into a conversion beam, and the conversion beam is guided to penetrate the corresponding filter along a direction parallel to the central axis.

An embodiment of the disclosure provides a projection device including an illumination module, a light valve, and a projection lens. The illumination module includes a light source device, a light-guiding element, and a color wheel module providing an illumination beam. The light source device is configured to provide an excitation beam. The color wheel module is disposed on a transmission path of the excitation beam. The color wheel module is located between the light source device and the light valve, and the color wheel module includes a driving assembly, a substrate, a fastening element, at least one wavelength conversion layer, and a plurality of filters. The filters are disposed around a rotating axis in a manner perpendicular to the rotating axis of the driving assembly. The fastening element is attached to the filters along the rotating axis. The substrate is connected to the filters, and the filters are fixed between the fastening element and the driving assembly. The driving assembly drives the substrate and the filters to rotate around the rotating axis as a central axis. The substrate includes an outer periphery surrounding the central axis, and the substrate includes a light conversion region located on the outer periphery. The outer periphery extends in an extension direction. The extension direction and a radial direction of the substrate form an included angle, and the outer periphery has a width parallel to the extension direction. The wavelength conversion layers are disposed in the light conversion region of the substrate. The excitation beam is incident on the light conversion region of the substrate and converted into a conversion beam, and the conversion beam is guided by the light-guiding element to penetrate the corresponding filter along a direction parallel to the central axis. The illumination beam includes the conversion beam. The light valve is disposed on a transmission path of the illumination beam to convert the illumination beam into an image beam. The projection lens is disposed on a transmission path of the image beam to project the image beam out of the projection device.

In summary, the embodiments of the disclosure have at least one of the following advantages or effects. In the design of the color wheel module of the disclosure, the light conversion region is located on the outer periphery of the substrate that is not parallel to the radial direction, the filters are disposed around the rotating axis in a manner perpendicular to the rotating axis of the driving assembly, and the wavelength conversion layers are disposed on the light conversion region on the outer periphery of the substrate. The excitation beam is incident perpendicularly or obliquely on the light conversion region of the outer periphery of the substrate and converted into a conversion beam, and the conversion beam is guided to penetrate the corresponding filters along a direction parallel to the central axis. Thereby, the heat dissipation efficiency and wavelength conversion efficiency of the wavelength conversion layers can be improved, such that the color wheel module of the disclosure has a better heat dissipation effect. Furthermore, with the configuration method, it is possible to increase the flexibility in the space design of the optical engine. In addition, the projection device using the color wheel module of the disclosure can have better projection quality and product competitiveness.

Other objectives, features and advantages of the disclosure will be further understood from the further technological features disclosed by the embodiments of the disclosure wherein there are shown and described exemplary of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of the disclosure. The drawings illustrate embodiments of the disclosure and, together with the description, serve to explain the principles of the disclosure.

DESCRIPTION OF THE EMBODIMENTS

In the following detailed description of the exemplary embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
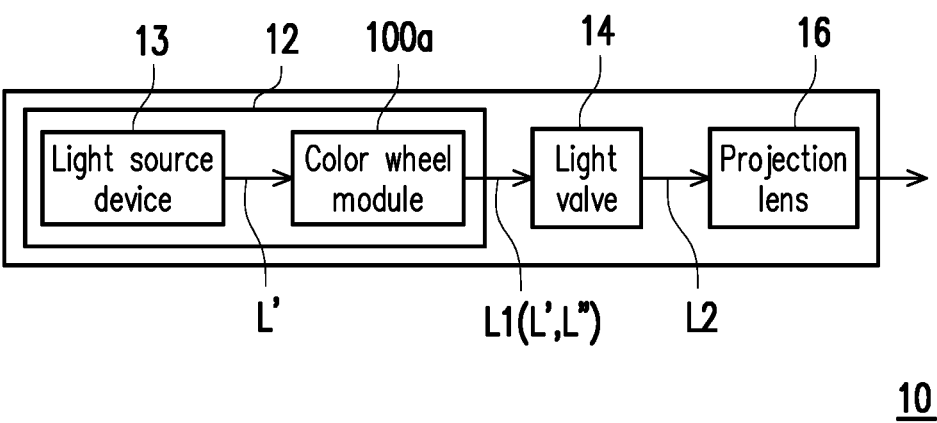
FIG. 1 is a schematic view of a projection device according to an embodiment of the disclosure.
Figure 2A:
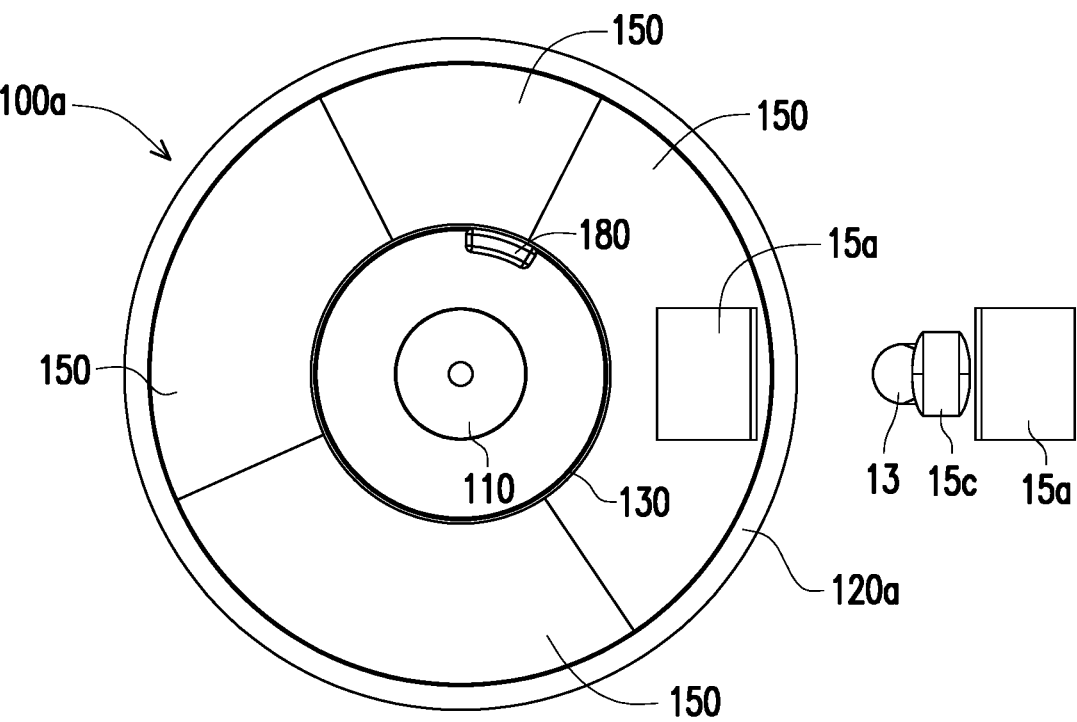
FIG. 2A is a schematic top view of the relative position of the color wheel module and the light-guiding element of the projection device of FIG. 1.
Figure 2B:
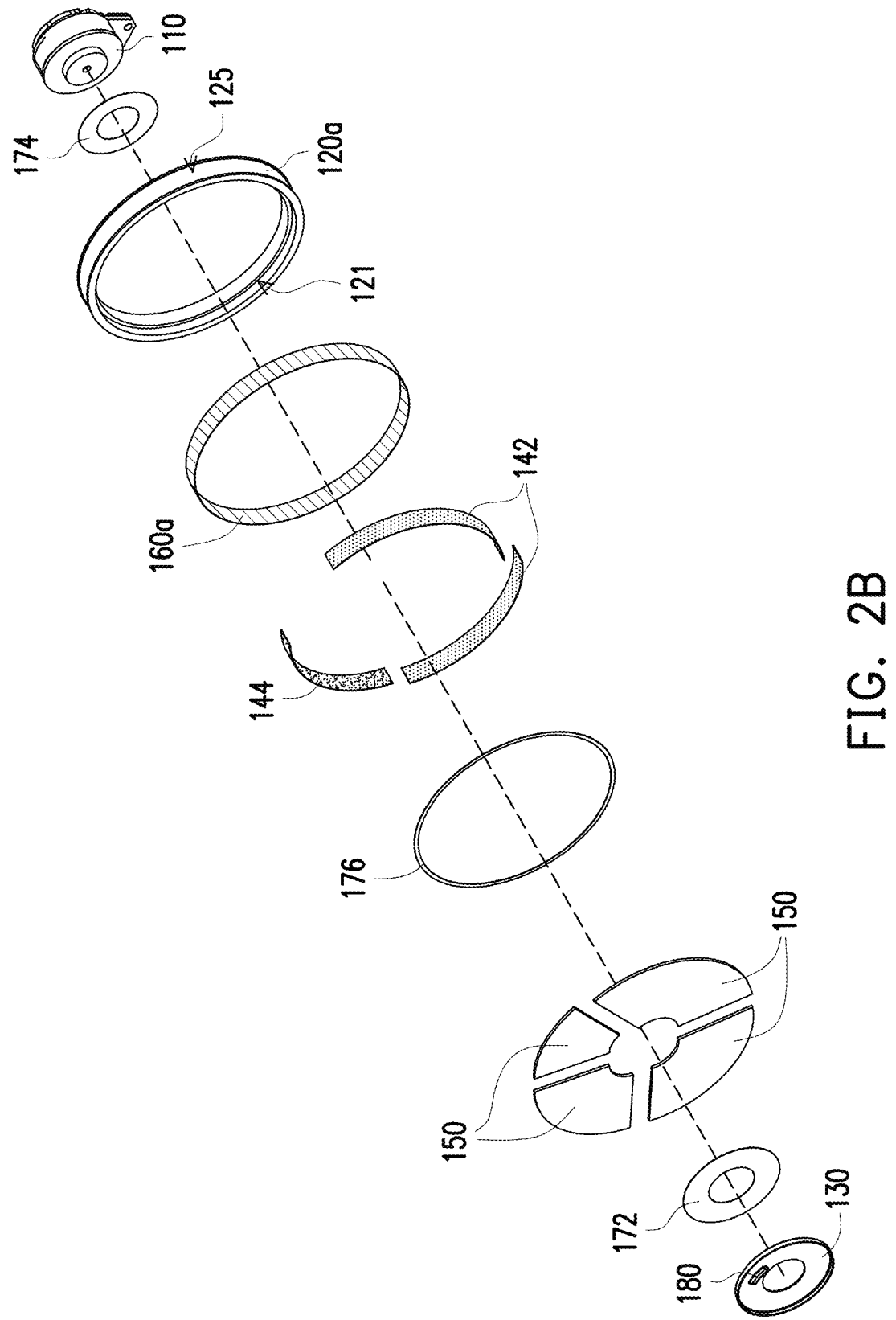
FIG. 2B is a three-dimensional exploded schematic view of the color wheel module of FIG. 2A.
Figures 2C, 2D:
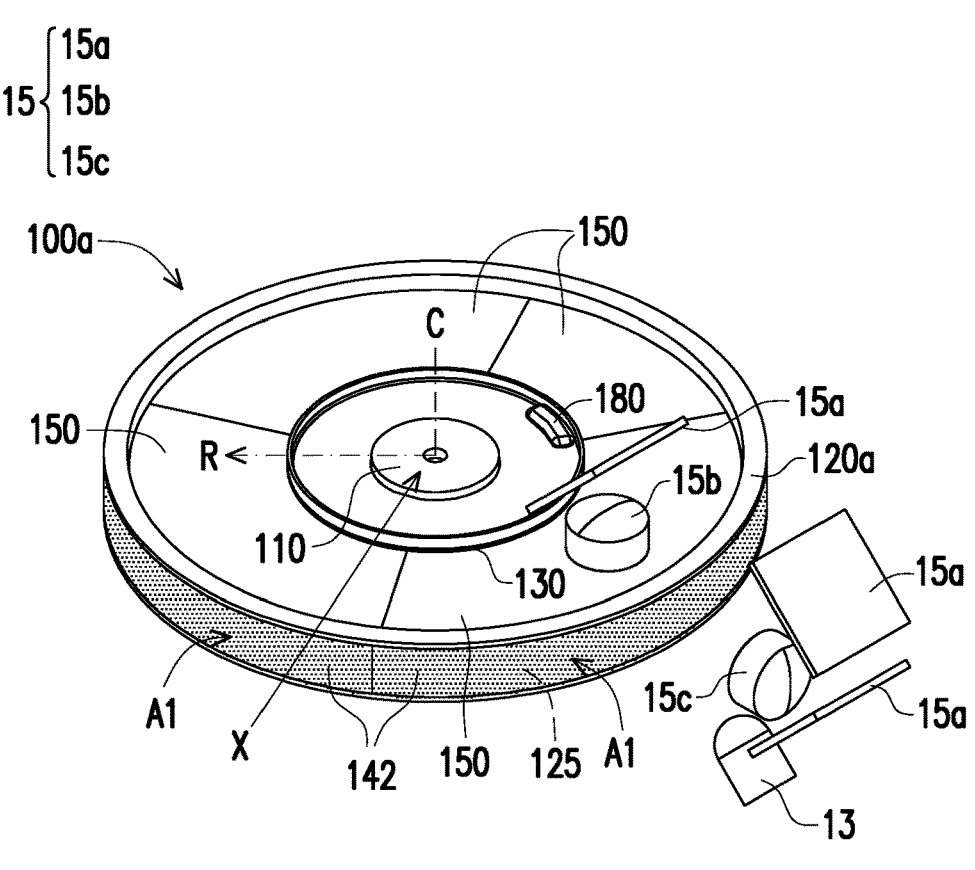
FIG. 2C is a three-dimensional schematic view of the relative position of the color wheel module and the light-guiding element of FIG. 2A.
FIG. 2D is a three-dimensional schematic view of the relative position of the color wheel module and the light-guiding element of FIG. 2C from another viewing angle.
Figure 2E:
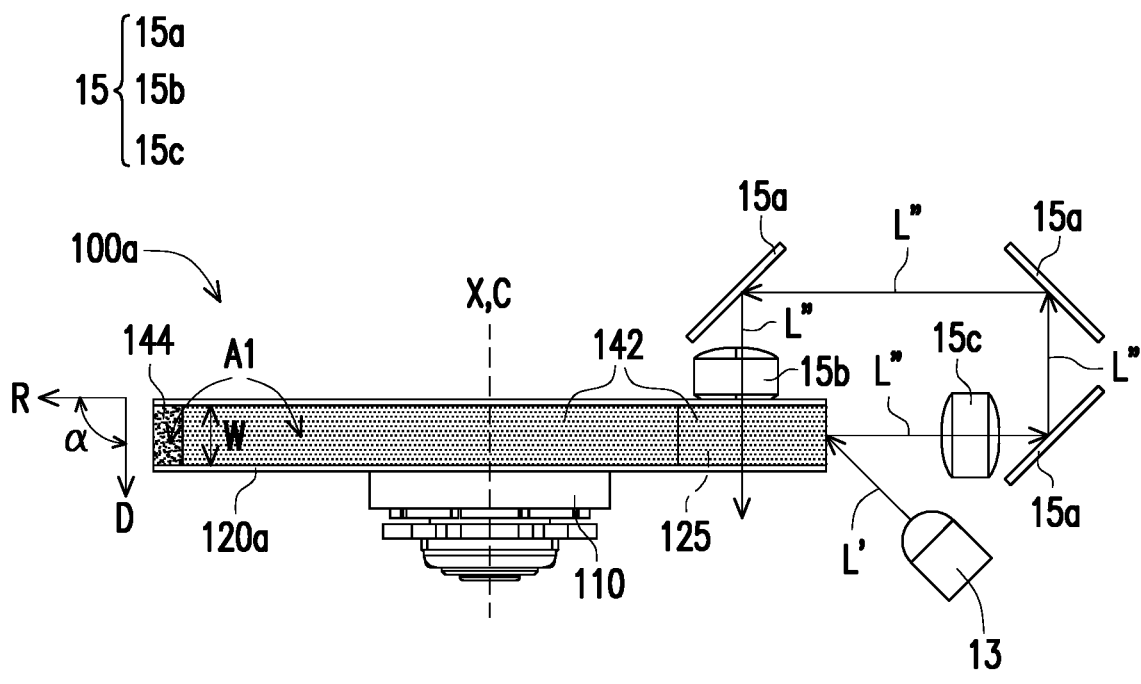
FIG. 2E is a schematic side view of the relative position of the color wheel module and the light-guiding element of FIG. 2A.
Figure 2F:
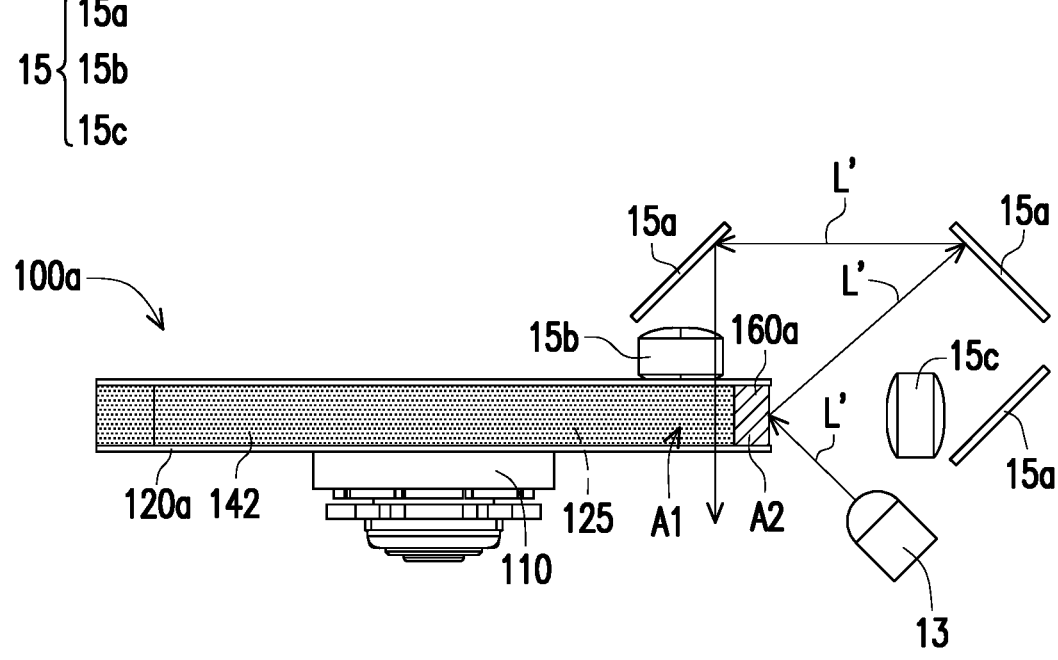
FIG. 2F is a schematic side view of the relative position of the color wheel module and the light-guiding element of FIG. 2A from another viewing angle.

FIG. 1 is a schematic view of a projection device according to an embodiment of the disclosure. FIG. 2A is a schematic top view of the relative position of the color wheel module and the light-guiding element of the projection device of FIG. 1. FIG. 2B is a three-dimensional exploded schematic view of the color wheel module of FIG. 2A. FIG. 2C is a three-dimensional schematic view of the relative position of the color wheel module and the light-guiding element of FIG. 2A. FIG. 2D is a three-dimensional schematic view of the relative position of the color wheel module and the light-guiding element of FIG. 2C from another viewing angle. FIG. 2E is a schematic side view of the relative position of the color wheel module and the light-guiding element of FIG. 2A. FIG. 2F is a schematic side view of the relative position of the color wheel module and the light-guiding element of FIG. 2A from another viewing angle.

Referring to FIG. 1 and FIG. 2C first, in this embodiment, a projection device 10 includes an illumination module 12, a light valve 14 and a projection lens 16. The illumination module 12 includes a light source device 13, a light-guiding element 15, and a color wheel module 100a. The illumination module 12 is configured to provide an illumination beam L1. The light source device 13 is configured to provide an excitation beam L'. The color wheel module 100a is disposed on a transmission path of the excitation beam L' emitted from the light source device 13. The color wheel module 100a is located between the light source device 13 and the light valve 14. The light valve 14 is disposed on a transmission path of the illumination beam L1 so as to convert the illumination beam L1 into an image beam L2. The projection lens 16 is disposed on a transmission path of the image beam L2 transmitted from the light valve 14 so as to project the image beam L2 out of the projection device 10 and form an image (not shown) on a projection plane.

Furthermore, the light source device 13 used in this embodiment may be, for example, at least one Laser Diode (LD), or, for example, a Laser Diode Bank. Specifically, any light source that meets the volume requirement in actual design may be implemented, and the disclosure is not limited thereto. The light valve 14 may be, for example, a reflective light modulator such as a Liquid Crystal On Silicon panel (LCoS panel) or a Digital Micro-mirror Device (DMD). In one embodiment, the light valve 14 may be, for example, a Transparent Liquid Crystal Panel, an Electro-Optical Modulator, a Magneto-Optical modulator, an Acousto-Optical Modulator (AOM), or other transmissive optical modulators, but the type of the light valve 14 is not limited in this embodiment. The detailed steps and implementation of the method by which the light valve 14 converts the illumination beam L1 into the image beam L2 can be adequately taught, suggested, and implemented by general knowledge and therefore will not be repeated. The light-guiding element 15 includes, for example, a plurality of reflection mirrors 15a, a first light-collecting lens 15b, and a second light-collecting lens 15c, but the disclosure is not limited thereto. Moreover, the projection lens 16 includes, for example, a combination of one or more optical lenses having a refractive power, including, for example, various combinations of non-planar lenses such as biconcave lenses, biconvex lenses, concave-convex lenses, convex-concave lenses, plano-convex lenses, and plano-concave lenses. In an embodiment, the projection lens 16 may also include a flat optical lens that receives the image beam L2 from the light valve 14 and projects it out of the projection device 10 in a reflective or penetrating manner. Herein, the type of the projection lens 16 is not limited in this embodiment.

Referring to FIG. 2A, FIG. 2B, FIG. 2C, FIG. 2D, FIG. 2E, and FIG. 2F at the same time, in this embodiment, the color wheel module 100a includes a driving assembly 110, a substrate 120a, a fastening element 130, at least one wavelength conversion layer (yellow wavelength conversion layers 142 and a green wavelength conversion layer 144 are schematically shown), and a plurality of filters 150 (four filters 150 are shown schematically). The filters 150 are disposed around a rotating axis X of the driving assembly 110 in a manner perpendicular to the rotating axis X. The fastening element 130 is attached to the filters 150 along the rotating axis X. The substrate 120a is connected to the filters 150, and the filters 150 are fixed between the fastening element 130 and the driving assembly 110. The driving assembly 110 drives the substrate 120a and the filters 150 to rotate around the rotating axis X as a central axis C; the central axis C may be, for example, the rotation center line of the substrate 120a. The substrate 120a includes an outer periphery 125 surrounding the central axis C, and the substrate 120a includes a light conversion region A1 located on the outer periphery 125. The outer periphery 125 extends in an extension direction D. The extension direction D and a radial direction R of the substrate 120a form an included angle $\alpha$, and the outer periphery 125 has a width W parallel to the extension direction D, in which the radial direction R is perpendicular to the central axis C. The included angle $\alpha$ may be, for example, greater than 0 degree and less than or equal to 90 degrees. Preferably, the outer periphery 125 is 90 degrees to the radial direction R (the included angle $\alpha$ is 90 degrees); that is, the extension direction D of the outer periphery 125 is parallel to the central axis C. The yellow wavelength conversion layers 142 and the green wavelength conversion layer 144 are disposed in the light conversion region A1 of the substrate 120a, wherein the width of the light conversion region A1 on the outer periphery 125 may be less than or equal to the width W of the outer periphery 125 parallel to the extension direction D.

Furthermore, in this embodiment, the shape of the substrate 120a and the shape of the fastening element 130 are hollow rings, respectively, wherein the substrate 120a and the fastening element 130 are provided coaxially with the driving assembly 110, respectively. Here, the substrate 120a is disposed around outer edges of the filters 150. The substrate 120a further includes a non-conversion region A2 located on the outer periphery 125, and the light conversion region A1 and the non-conversion region A2 are adjacently disposed on the outer periphery 125. The substrate 120a may be a transparent substrate with high thermal conductivity or an opaque substrate with high thermal conductivity. The material of the substrate 120a may be, for example, sapphire, aluminum nitride, aluminum oxide, ceramic composite material, or metal alloy, but the disclosure is not limited thereto. Furthermore, the color wheel module 100a of this embodiment further includes a reflective layer 160a, wherein the reflective layer 160a is disposed in the light conversion region A1 and the non-conversion region A2 of the substrate 120a. Here, the reflective layer 160a has a ring structure, and part of the reflective layer 160a is located between the yellow wavelength conversion layers 142 and the outer periphery 125 and between the green wavelength conversion layer 144 and the outer periphery 125. The reflective layer 160a may be a coated mirror reflective layer, a coated diffuse reflection layer, or a composite of the above two types of coatings or layers.

Further, as shown in FIG. 2B, the color wheel module 100a of this embodiment further includes a first glue layer 172, a second glue layer 174, and a third glue layer 176. The first glue layer 172 is disposed between the fastening element 130 and the filters 150, wherein the fastening element 130 is connected to the filters 150 through the first glue layer 172. The second glue layer 174 is disposed between the driving assembly 110 and the filters 150, wherein the driving assembly 110 is connected to the filters 150 through the second glue layer 174. The third glue layer 176 is disposed between a surface 121 of the substrate 120a and the filters 150, wherein the filters 150 are connected to the surface 121 of the substrate 120a through the third glue layer 176, and the surface 121 is parallel to the radial direction R. Moreover, balance material 180 may also be provided on the fastening element 130 to perform balance correction of the dynamic balance of the color wheel module 100a. In another embodiment, the surface 121 is a top surface of the substrate 120a, and the top surface is connected to the outer periphery 125.

Referring to FIG. 2C and FIG. 2E at the same time, in this embodiment, a lens optical axis (not shown) of the first light-collecting lens 15b of the light-guiding element 15 is parallel to the central axis C and is corresponding to the arrangement of the filters 150. A lens optical axis (not shown) of the second light-collecting lens 15c of the light-guiding element 15 is provided perpendicular to the central axis C and is correspondingly adjacent to the outer periphery 125. The excitation beam U provided by the light source device 13 may be, for example, a blue excitation beam. When the substrate 120a rotates around the rotating axis X as the central axis C, the light conversion region A1 and the non-conversion region A2 sequentially enter the transmission path of the excitation beam U. When the excitation beam U is incident on the light conversion region A1 of the outer periphery 125 of the substrate 120a, the excitation beam U is converted into a conversion beam L", and the conversion beam L" is guided to penetrate corresponding filters 150 along a direction parallel to the central axis C. In one embodiment, a blue excitation beam L' may also be directly guided to a subsequent light uniforming element without passing through the filters 150. In another embodiment, the color wheel module 100a includes a transparent diffuser (not shown), and the diffuser and the filters 150 are disposed around the rotating axis X in a manner perpendicular to the rotating axis X of the driving assembly 110. The blue excitation beam L' may be guided to the diffuser, and penetrate the diffuser to the subsequent light uniforming element. Here, as shown in FIG. 1, the illumination beam L1 of this embodiment includes at least one of the excitation beam L' and the conversion beam L". The illumination beam L1 includes the excitation beam L' or the conversion beam L" at different time period.

More specifically, referring to FIGS. 2C and 2E at the same time, the blue excitation beam L' from the light source device 13 may be incident obliquely on the light conversion region A1 of the outer periphery 125 of the substrate 120a to be converted into the conversion beam L". The excitation beam L' may be, for example, incident obliquely on the yellow wavelength conversion layers 142 in the light conversion region A1 and correspondingly converted into a diffused yellow conversion beam L". The reflective layer 160a (refer to FIG. 2B) located under the yellow wavelength conversion layers 142 reflects the conversion beam L" such that the conversion beam L" is sequentially guided by the second light-collecting lens 15c, the reflection mirrors 15a, and the first light-collecting lens 15b to penetrate the corresponding filters 150 (e.g. yellow filter or red filter) along a direction parallel to the central axis C. After that, the conversion beam L" is filtered by the corresponding filter 150 to form a color light (for example, yellow light or red light). The color of the filtered conversion beam is different from the color of the excitation beam. Further, the excitation beam L' may be incident obliquely in the green wavelength conversion layer 144 of the light conversion region A1 at different timings and correspondingly converted into a diffused green conversion beam L". The reflective layer 160a located under the green wavelength conversion layer 144 reflects the conversion beam L" such that the conversion beam L" is sequentially guided by the second light-collecting lens 15c, the reflection mirrors 15a, and the first light-collecting lens 15b to penetrate the corresponding filters 150 (e.g. green filter) along a direction parallel to the central axis C). After that, the conversion beam L" is filtered by the filters 150 to form green light. Referring to FIG. 2D and FIG. 2F, when the non-conversion region A2 of the substrate 120a enters the transmission path of the blue excitation beam L', the excitation beam L' is incident obliquely on the non-conversion region A2 of the substrate 120a and is reflected by the reflective layer 160a. The blue excitation beam L' is guided by one or more reflection mirrors 15a to the first light-collecting lens 15b. Subsequently the first light-collecting lens 15b guides the excitation beam L' to penetrate the corresponding filters 150 or a diffuser (not shown) without filtering function along a direction parallel to the central axis C, and forms blue light.

In short, in the color wheel module 100a of this embodiment, two yellow wavelength conversion layers 142 and one green wavelength conversion layer 144 are provided in the light conversion region A1 of the outer periphery 125 of the substrate 120a. The non-conversion region A2 disposes without wavelength conversion layers but disposes only the reflective layer 160a, and the filters 150 are provided in the radial direction R of the substrate 120a. The filters 150 are, for example, located between the outer periphery 125 of the substrate 120a and the rotating axis X of the driving assembly 110 in the radial direction R such that the color wheel module 100a function as both a phosphor wheel and a filter wheel. Furthermore, by configuring the light source device 13 to project the blue excitation beam L' on the light conversion region A1 provided on the outer periphery 125 to respectively generate green, yellow, and/or red light (the conversion beam), which are then guided to the corresponding filters 150 through the reflection mirrors 15a, the first light-collecting lens 15b, and the second light-collecting lens 15c, comprehensive application of the phosphor wheel and the filter wheel can be enabled and the benefit of reducing the size of the optical engine can be achieved. At the same time, the heat dissipation efficiency and wavelength conversion efficiency of the wavelength conversion layers can also be improved such that the color wheel module 100a of this embodiment has a better heat dissipation effect. Compared with the prior art in which the wavelength conversion layers are provided on the plane of a heat dissipation substrate in a radial direction, with the configuration of this embodiment, the heat dissipation efficiency of the color wheel module 100a can be increased from 100% to 300%, and the excitation efficiency can also be increased from 100% to 300%. Moreover, through the configuration, the flexibility in the space design of the optical engine and the flexibility in the design of the optical path of the optical engine can be increased, and the manufacturing cost of the projection device 10 can also be reduced. Further, the projection device 10 using the color wheel module 100a of this embodiment can have better projection quality and product competitiveness.

The following embodiments use the element numbers and part of the content of the foregoing embodiments, wherein the same reference numerals are used to represent the same or similar elements, and the description of the same technical content is omitted. For the description of the omitted parts, reference may be made to the foregoing embodiments, and will not be repeated in the following embodiments.

Figure 3A:
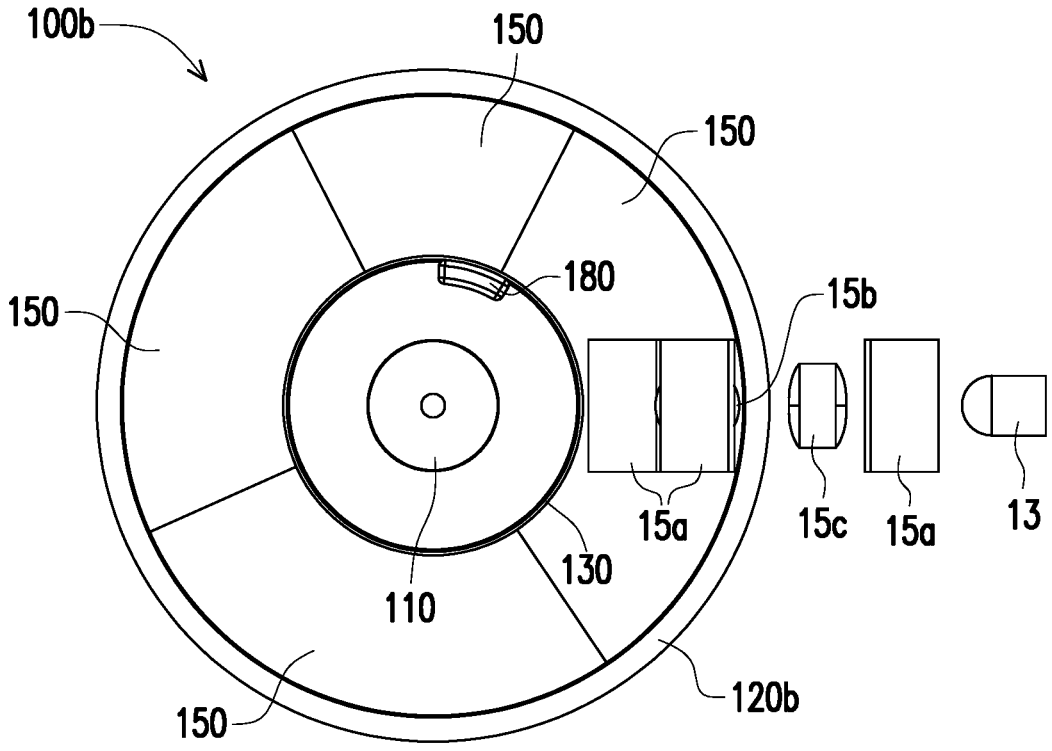
FIG. 3A is a schematic top view of the relative position of a color wheel module and a light-guiding element according to an embodiment of the disclosure.
Figure 3B:
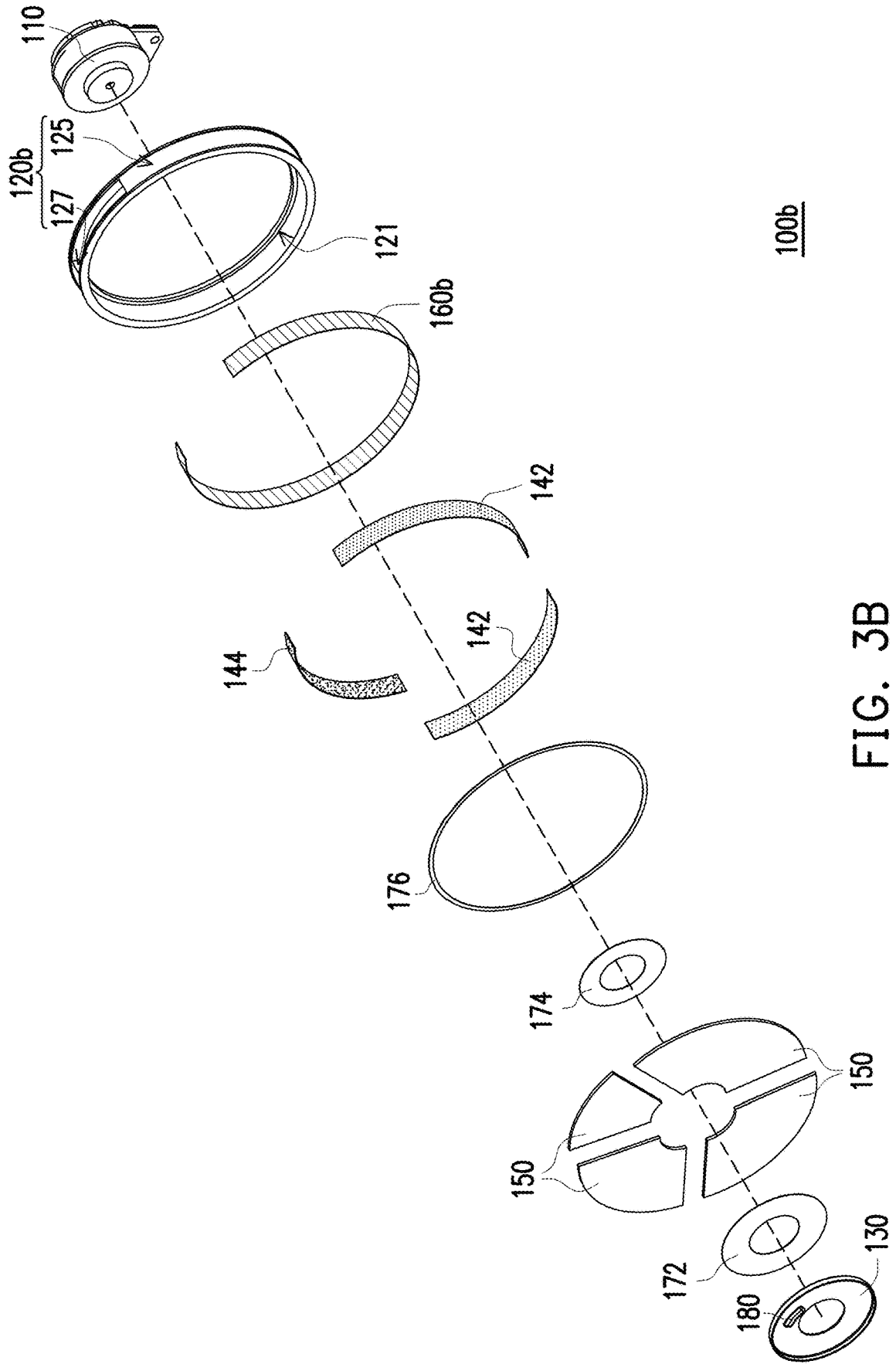
FIG. 3B is a three-dimensional exploded schematic view of the color wheel module of FIG. 3A.
Figure 3C:
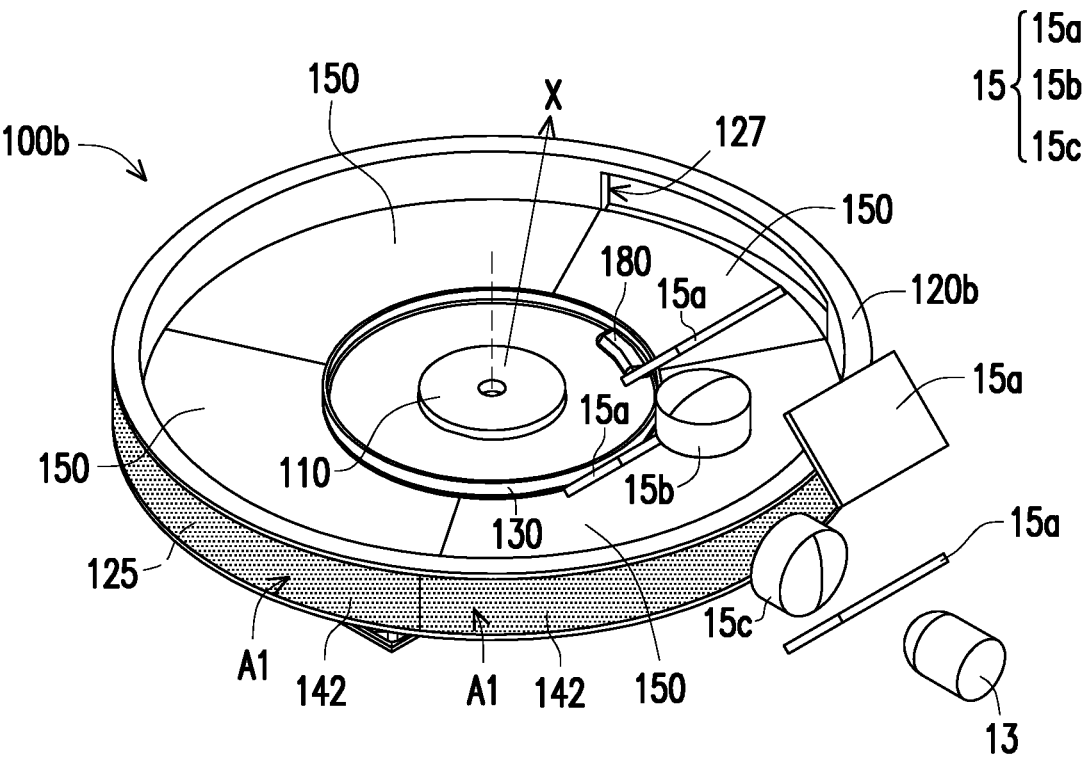
FIG. 3C is a perspective schematic view of the relative position of the color wheel module and the light-guiding element of FIG. 3A.
Figure 3D:
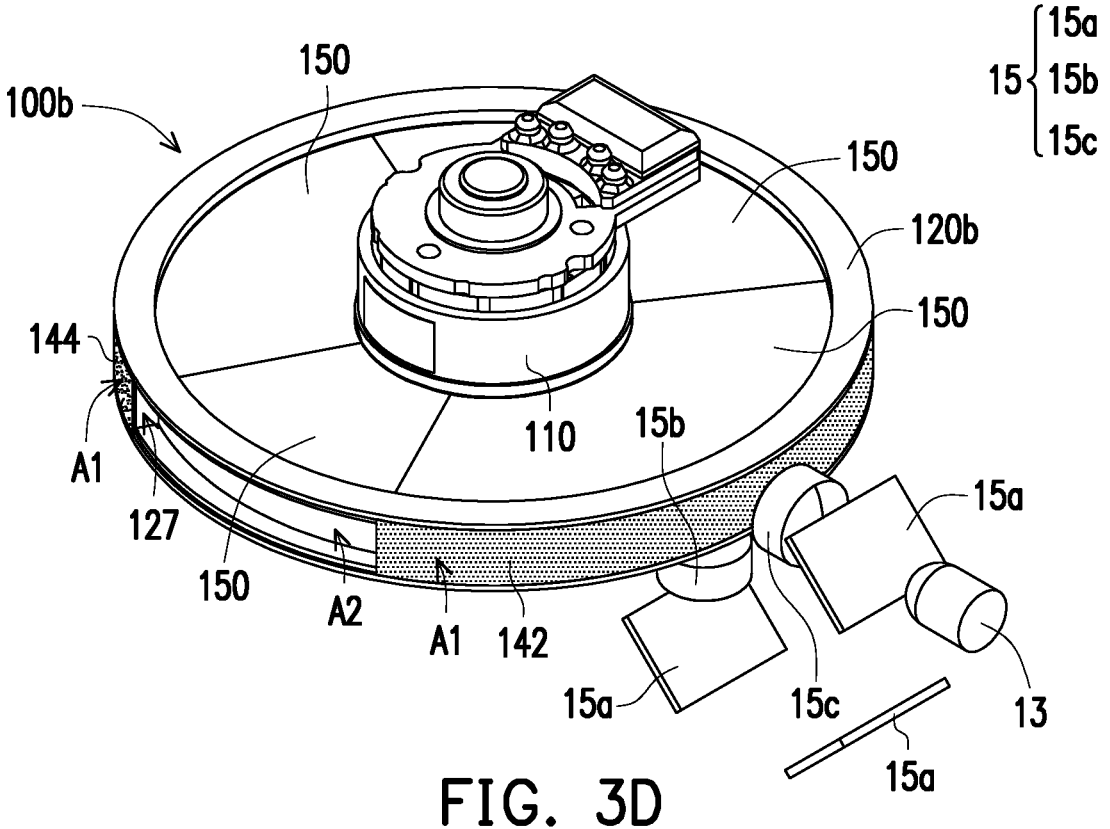
FIG. 3D is a three-dimensional schematic view of the relative position of the color wheel module and the light-guiding element in FIG. 3C from another viewing angle.
Figure 3E:
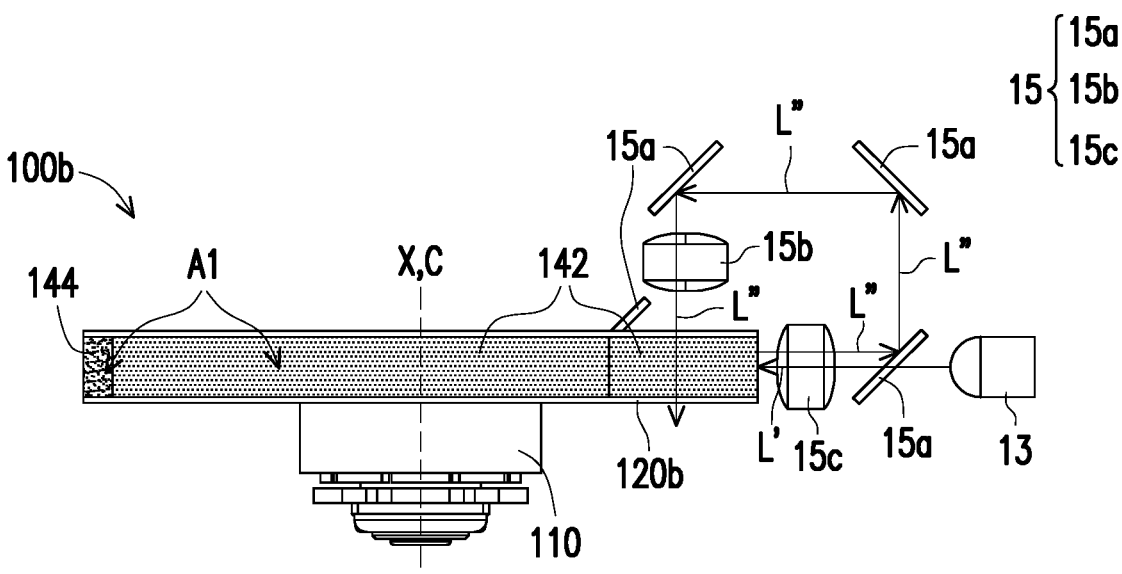
FIG. 3E is a schematic side view of the relative position of the color wheel module and the light-guiding element of FIG. 3A.
Figure 3F:
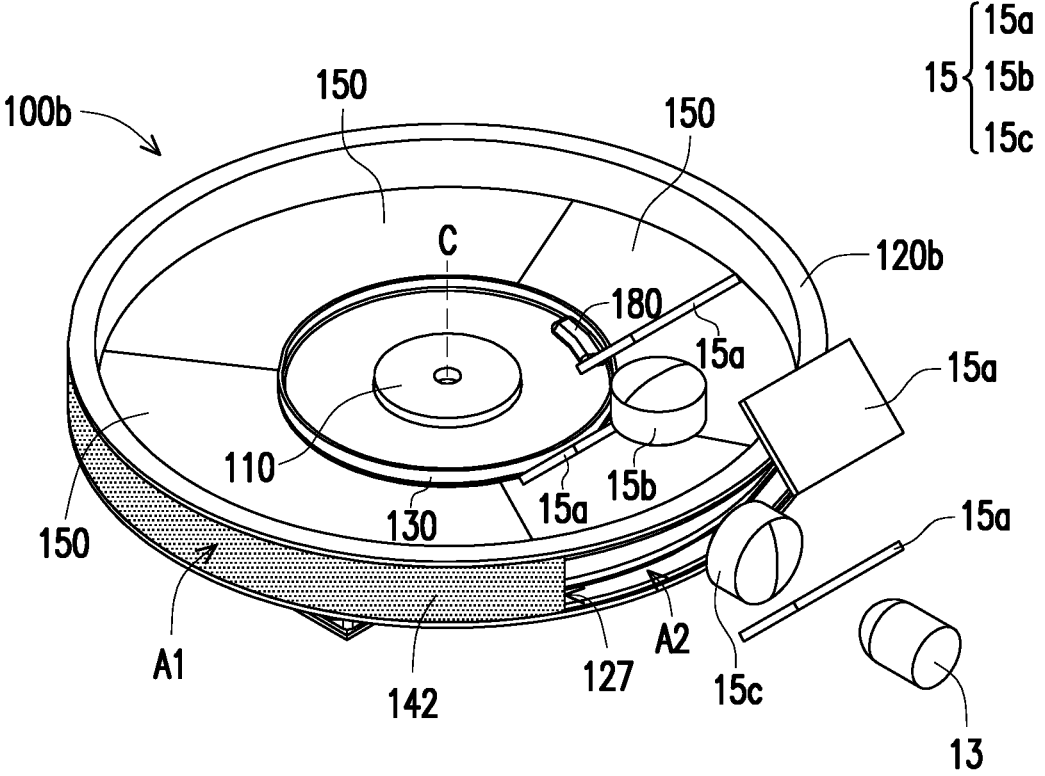
FIG. 3F is a three-dimensional schematic view of the relative position of the color wheel module and the light-guiding element of FIG. 3A from another viewing angle.
Figure 3G:
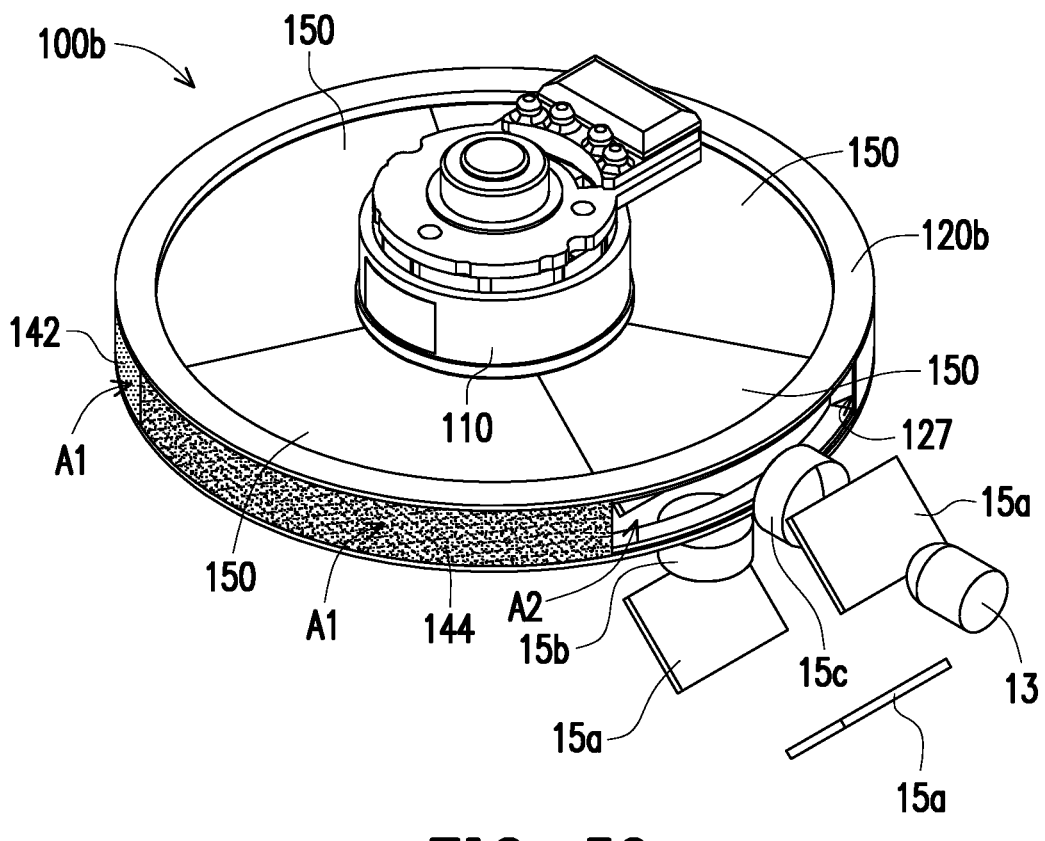
FIG. 3G is a three-dimensional schematic view of the relative position of the color wheel module and the light-guiding element in FIG. 3F from another viewing angle.
Figure 3H:
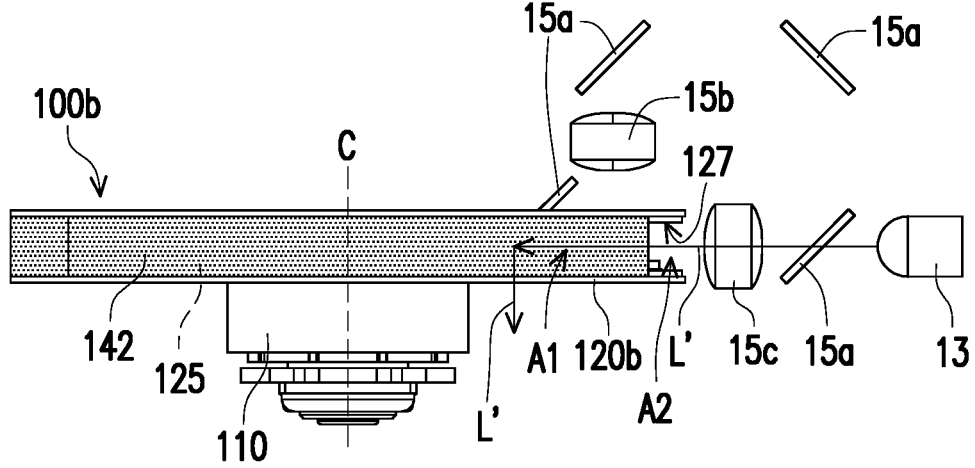
FIG. 3H is a schematic side view of the relative position of the color wheel module and the light-guiding element of FIG. 3A from another viewing angle.

FIG. 3A is a schematic top view of the relative position of a color wheel module and a light-guiding element according to an embodiment of the disclosure. FIG. 3B is a three-dimensional exploded schematic view of the color wheel module of FIG. 3A. FIG. 3C is a perspective schematic view of the relative position of the color wheel module and the light-guiding element of FIG. 3A. FIG. 3D is a three-dimensional schematic view of the relative position of the color wheel module and the light-guiding element in FIG. 3C from another viewing angle. FIG. 3E is a schematic side view of the relative position of the color wheel module and the light-guiding element of FIG. 3A. FIG. 3F is a three-dimensional schematic view of the relative position of the color wheel module and the light-guiding element of FIG. 3A from another viewing angle. FIG. 3G is a three-dimensional schematic view of the relative position of the color wheel module and the light-guiding element in FIG. 3F from another viewing angle. FIG. 3H is a schematic side view of the relative position of the color wheel module and the light-guiding element of FIG. 3A from another viewing angle.

Referring to FIG. 2A, FIG. 2B, FIG. 3A, FIG. 3B, and FIG. 3D at the same time, a color wheel module 100b of this embodiment is similar to the color wheel module 100a of FIG. 2B. The difference between the two is that the outer periphery 125 of a substrate 120b has an opening 127 and the opening 127 corresponds to the non-conversion region A2 of the substrate 120b in this embodiment. And the reflection mirror 15a disposed between the light source device 13 and the outer periphery 125 of the substrate 120b is a dichroic mirror which allows the blue excitation beam L' passing therethrough and reflects the conversion beam L". Furthermore, a reflective layer 160b is disposed in the light conversion region A1 of the substrate 120b, wherein the reflective layer 160b is located between the wavelength conversion layers 142, 144 and the outer periphery 125. In other words, the reflective layer 160b of this embodiment is not a complete ring structure, but an arc structure, exposing the opening 127 of the outer periphery 125.

Referring to FIGS. 3C, 3D, and 3E at the same time, the blue excitation beam L' from the light source device 13 passes through dichroic mirror (the reflection mirror 15a) and is incident on the light conversion region A1 of the outer periphery 125 of the substrate 120b along a direction perpendicular to the central axis C to be converted into a conversion beam L" which has a different color from the excitation beam L'. The conversion beam L" may be a green, yellow, and/or red light. The excitation beam L' may be, for example, perpendicularly incident on the yellow wavelength conversion layers 142 in the light conversion region A1 and correspondingly converted into a diffused yellow conversion beam L". The reflective layer 160b (refer to FIG. 3B) located under the yellow wavelength conversion layers 142 reflects the conversion beam L" such that the conversion beam L" is sequentially guided by the second light-collecting lens 15c, the reflection mirrors 15a, and the first light-collecting lens 15b to penetrate the corresponding filters 150 (e.g. yellow filter or red filter) along a direction parallel to the central axis C). After that, the conversion beam L" is filtered by the filters 150 to form a color light (for example, yellow light or red light). The color of the filtered conversion beam is different from the color of the excitation beam. Moreover, the excitation beam L' passes through dichroic mirror (the reflection mirror 15a) and is perpendicularly incident on the green wavelength conversion layer 144 in the light conversion region A1 at different timings and correspondingly converted into a diffused green conversion beam L". The reflective layer 160b located under the green wavelength conversion layer 144 reflects the conversion beam L" such that the conversion beam L" is sequentially guided by the second light-collecting lens 15c, the reflection mirrors 15a, and the first light-collecting lens 15b to penetrate the corresponding filters 150 (e.g. green filter) in a direction parallel to the central axis C. After that, the conversion beam L" is filtered by the filters 150 to form green light. Referring to FIGS. 3F, 3G and 3H at the same time, when the non-conversion region A2 of the substrate 120b enters the transmission path of the blue excitation beam L', the excitation beam L' passes through dichroic mirror (the reflection mirror 15a) and is incident on the non-conversion region A2 of the substrate 120b in a direction perpendicular to the central axis C. Then the excitation beam L' penetrates the opening 127. The blue excitation beam L' is reflected by the reflection mirrors 15a provided between the opening 127 and the driving assembly 110 and penetrates the corresponding filters 150 or a diffuser (not shown) without filtering function along a direction parallel to the central axis C, and forms blue light.

In short, the color wheel module 100b of this embodiment includes two yellow wavelength conversion layers 142 and one green wavelength conversion layer 144 provided on the light conversion region A1 of the outer periphery 125 of the substrate 120b. The non-conversion region A2 does not dispose with wavelength conversion layers but is provided with the opening 127, and the filters 150 are provided on the plane in the radial direction, such that the color wheel module 100b function as both a phosphor wheel and a filter wheel. Furthermore, by configuring the light source device 13 to project the blue excitation beam L' on the light conversion region A1 provided on the outer periphery 125 to respectively generate the conversion beam (green, yellow, and/or red lights), which are then guided to the corresponding filters 150 through the reflection mirrors 15a, the first light-collecting lens 15b, and the second light-collecting lens 15c, comprehensive application of the phosphor wheel and the filter wheel can be enabled and the benefit of reducing the size of the optical engine can be achieved. At the same time, the heat dissipation efficiency and wavelength conversion efficiency of the wavelength conversion layers can also be improved, such that the color wheel module 100b of this embodiment has a better heat dissipation effect. Moreover, the opening 127 on the outer periphery 125 of the substrate 120b allows the blue excitation beam L' to penetrate, and, together with the reflection mirrors 15a, allows the blue excitation beam L' to enter the filters 150 or the diffuser on the plane in the radial direction, such that the blue excitation beam L' can generate green light, yellow light, red light, and blue light before passing through the filters 150.

In summary, the embodiments of the disclosure have at least one of the following advantages or effects. In the design of the color wheel module of the disclosure, the light conversion region is located on the outer periphery of the substrate that is not parallel to the radial direction, the filters are configured around the rotating axis in a manner perpendicular to the rotating axis of the driving assembly, and the wavelength conversion layers are disposed on the light conversion region on the outer periphery. The excitation beam is incident perpendicularly or obliquely on the light conversion region of the outer periphery of the substrate and converted into a conversion beam, and the conversion beam is guided to penetrate the corresponding filters along a direction parallel to the central axis. Thereby, the heat dissipation efficiency and wavelength conversion efficiency of the wavelength conversion layers can be improved, such that the color wheel module of the disclosure has a better heat dissipation effect. Furthermore, through the configuration method, it is possible to increase the flexibility in the space design of the optical engine. In addition, the projection device using the color wheel module of the disclosure can have better projection quality and product competitiveness.

The foregoing description of the preferred of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the invention", "the disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be configured to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the present disclosure is intended to be dedicated to the public regardless of whether the element or component is explicitly recited in the following claims.

What is claimed is:

1. A color wheel module, disposed on a transmission path of an excitation beam, the color wheel module comprising: a driving assembly, a substrate, a fastening element, a first glue layer, a second glue layer, a third glue layer, at least one wavelength conversion layer, and a plurality of filters; wherein the plurality of filters are disposed around a rotating axis in a manner perpendicular to the rotating axis of the driving assembly;

the fastening element is attached to the plurality of filters along the rotating axis;

the substrate is connected to the plurality of filters, and the plurality of filters are fixed between the fastening element and the driving assembly;

the driving assembly drives the substrate and the plurality of filters to rotate around the rotating axis as a central axis;

a shape of the substrate is a hollow ring, the substrate comprises an outer periphery surrounding the central axis, and the substrate comprises a light conversion region located on the outer periphery, wherein the outer periphery extends in an extension direction, the extension direction and a radial direction of the substrate form an included angle, and the outer periphery has a width parallel to the extension direction; and the at least one wavelength conversion layer is disposed in the light conversion region of the substrate;

wherein the excitation beam is incident on the light conversion region of the substrate and converted into a conversion beam, and the conversion beam is guided to penetrate the corresponding one of the filters along a direction parallel to the central axis;

the first glue layer is disposed between the fastening element and the plurality of filters, wherein the fastening element is connected to the plurality of filters through the first glue layer;

the second glue layer is disposed between the driving assembly and the plurality of filters, wherein the driving assembly is connected to the plurality of filters through the second glue layer; and the third glue layer is disposed between a surface the of the substrate and the plurality of filters, wherein the surface of the substrate is parallel to the radial direction, and the plurality of filters are connected to the surface of the substrate through the third glue layer.

2. The color wheel module according to claim 1, wherein the included angle is greater than 0 degree and less than or equal to 90 degrees.

3. The color wheel module according to claim 1, wherein the substrate comprises a non-conversion region located on the outer periphery, and the light conversion region and the non-conversion region are disposed adjacent to each other.

4. The color wheel module according to claim 3, further comprising:

a reflective layer, disposed in the light conversion region and the non-conversion region of the substrate, and part of the reflective layer is located between the at least one wavelength conversion layer and the outer periphery, wherein the excitation beam is incident obliquely on the light conversion region of the substrate to be converted into the conversion beam, and the reflective layer reflects the conversion beam such that the conversion beam is guided to penetrate the corresponding plurality of filters along the direction parallel to the central axis; and the excitation beam is incident obliquely on the non-conversion region of the substrate and is reflected by the reflective layer.

5. The color wheel module according to claim 3, wherein the outer periphery of the substrate has an opening, and the opening corresponds to the non-conversion region of the substrate, the color wheel module further comprising:

a reflective layer, disposed in the light conversion region of the substrate, wherein the reflective layer is located between the at least one wavelength conversion layer and the outer periphery, wherein the excitation beam is incident on the light conversion region of the substrate along the direction perpendicular to the central axis to be converted into the conversion beam, and the reflective layer reflects the conversion beam such that the conversion beam is guided to penetrate the corresponding plurality of filters along the direction parallel to the central axis; and the excitation beam is incident on the non-conversion region of the substrate along the direction perpendicular to the central axis and penetrates the opening.

6. The color wheel module according to claim 1, wherein the at least one wavelength conversion layer comprises a yellow wavelength conversion layer and a green wavelength conversion layer, and the excitation beam is a blue excitation beam.

7. The color wheel module according to claim 1, wherein the fastening element is in a shape of a hollow ring, and the substrate and the fastening element are provided coaxially with the driving assembly, respectively.

8. The color wheel module according to claim 1, wherein material of the substrate comprises sapphire, aluminum nitride, aluminum oxide, ceramic composite material or metal alloy.

9. The color wheel module according to claim 1, wherein the substrate is disposed around outer edges of the plurality of filters.

10. A projection device, comprising: an illumination module, a light valve, and a projection lens; wherein, the illumination module comprises a light source device, a light-guiding element, and a color wheel module for providing an illumination beam, the light source device configured to provide an excitation beam, the color wheel module disposed on a transmission path of the excitation beam, the color wheel module located between the light source device and the light valve, and the color wheel module comprising a driving assembly, a substrate, a fastening element, a first glue layer, a second glue layer, a third glue layer, at least one wavelength conversion layer, and a plurality of filters; wherein the plurality of filters are disposed around a rotating axis in a manner perpendicular to the rotating axis of the driving assembly;

the fastening element is attached to the plurality of filters along the rotating axis;

the substrate is connected to the plurality of filters, and the plurality of filters are fixed between the fastening element and the driving assembly;

the driving assembly drives the substrate and the plurality of filters to rotate around the rotating axis as a central axis;

a shape of the substrate is a hollow ring, the substrate comprises an outer periphery surrounding the central axis, and the substrate has a light conversion region disposed on the outer periphery, wherein the outer periphery extends in an extension direction, the extension direction and a radial direction of the substrate forms an included angle, and the outer periphery has a width parallel to the extension direction;

the first glue layer is disposed between the fastening element and the plurality of filters, wherein the fastening element is connected to the plurality of filters through the first glue layer;

the second glue layer is disposed between the driving assembly and the plurality of filters, wherein the driving assembly is connected to the plurality of filters through the second glue layer;

the third glue layer is disposed between a surface of the substrate and the plurality of filters, wherein the surface of the substrate is parallel to the radial direction, and the plurality of filters are connected to the surface of the substrate through the third glue layer; and the at least one wavelength conversion layer is disposed in the light conversion region of the substrate;

wherein the excitation beam is incident on the light conversion region of the substrate and converted into a conversion beam, and the conversion beam is guided by the light-guiding element to penetrate the corresponding one of the filters along a direction parallel to the central axis, the illumination beam comprising the conversion beam;

the light valve is disposed on a transmission path of the illumination beam to convert the illumination beam into an image beam; and the projection lens is disposed on a transmission path of the image beam to project the image beam out of the projection device.

11. The projection device according to claim 10, wherein the light-guiding element comprises a plurality of reflection mirrors, a first light-collecting lens, and a second light-collecting lens, wherein the first light-collecting lens is provided parallel to the central axis and corresponding to the plurality of filters, and the second light-collecting lens is provided perpendicular to the central axis and correspondingly beside the outer periphery.

12. The projection device according to claim 10, wherein the substrate is disposed around outer edges of the plurality of filters.

* * * * *